US008378233B2

(12) United States Patent
Clymer

(10) Patent No.: US 8,378,233 B2
(45) Date of Patent: Feb. 19, 2013

(54) AIRCRAFT INTERIOR BUSHING

(75) Inventor: James L. Clymer, Bellingham, WA (US)

(73) Assignee: Heath Tecna Inc., Bellingham, WA (US)

( * ) Notice: Subject to any disclaimer, the term of this patent is extended or adjusted under 35 U.S.C. 154(b) by 303 days.

(21) Appl. No.: 12/845,257

(22) Filed: Jul. 28, 2010

(65) Prior Publication Data
US 2011/0024184 A1 Feb. 3, 2011

Related U.S. Application Data

(60) Provisional application No. 61/229,687, filed on Jul. 29, 2009.

(51) Int. Cl.
*H02B 1/40* (2006.01)
*H02G 3/08* (2006.01)
*H02G 3/18* (2006.01)
*B64C 1/00* (2006.01)

(52) U.S. Cl. ......... 174/503; 174/481; 174/650; 244/119

(58) Field of Classification Search .................. 174/503, 174/559, 481, 650, 652, 656, 152 R, 74 R; 403/110; 244/119; 248/49, 56, 63, 73, 74.1, 248/74.3
See application file for complete search history.

(56) References Cited

U.S. PATENT DOCUMENTS

| | | | |
|---|---|---|---|
| 3,064,984 A | 11/1962 | Mickle et al. | |
| 3,516,111 A | 6/1970 | Heyman | |
| 3,986,228 A | 10/1976 | Dowse | |
| 4,000,875 A | 1/1977 | Jemison et al. | |
| 4,002,822 A | 1/1977 | Kurosaki | |
| 4,299,363 A | 11/1981 | Datschefski | |
| 4,350,839 A | 9/1982 | Lass | |
| 4,433,452 A | 2/1984 | Frano | |
| 4,685,173 A | 8/1987 | Pavur | |
| 4,872,512 A * | 10/1989 | Multer | 169/51 |
| 5,060,891 A * | 10/1991 | Nagy et al. | 248/56 |
| 5,071,143 A * | 12/1991 | Byerly et al. | 277/606 |
| 5,526,549 A | 6/1996 | Mori et al. | |
| 5,545,854 A * | 8/1996 | Ishida | 174/153 G |
| 5,739,475 A | 4/1998 | Fujisawa et al. | |
| 6,070,835 A * | 6/2000 | Stillinger | 248/56 |
| 6,563,055 B1 | 5/2003 | Burdick | |
| 2008/0116319 A1* | 5/2008 | Negley et al. | 244/119 |

* cited by examiner

Primary Examiner — Jinhee Lee
Assistant Examiner — Abhishek Rathod
(74) Attorney, Agent, or Firm — Dwayne E. Rogge; Schacht Law Office, Inc.

(57) ABSTRACT

An aircraft interior bushing assembly is disclosed comprising interoperating bushings, each bushing comprising a recessing portion, a radially inner surface operably configured to contact a surface defining a void in a panel, a perimeter portion wherein the perimeter portion is substantially larger than the recessing portion, a support arm receiver, and a support arm coupled to each bushing. Each support arm comprises a first end coupled to the bushing, and a second end comprising a conduit receiver. In one form, the bushing assembly is operably configured to support a conduit at a distance from the radially inner surface of the interoperating bushings to substantially prohibit contact between the conduit and the bushing assembly once the conduit is installed and fixed to the conduit receiver.

11 Claims, 13 Drawing Sheets

AIRCRAFT INTERIOR BUSHING

RELATED APPLICATIONS

This application claims priority benefit of U.S. Ser. No. 61/229,687, filed Jul. 29, 2009.

BACKGROUND OF THE DISCLOSURE a) Field of the Disclosure

This disclosure generally regards the field of providing a bushing or grommet to allow safe and secure pass-through of electric cables, wires, wire bundles, conduits and other structures through panels. This disclosure is especially suited for use in aircraft, specifically aircraft interiors.

SUMMARY OF THE DISCLOSURE

An aircraft interior bushing assembly is herein disclosed comprising a pair of interoperating bushings, each bushing comprising a recessing portion, a radially inner surface operably configured to contact a surface defining a void in a panel, a perimeter portion wherein the radial dimension of the perimeter portion is substantially larger than the recessing portion, a support arm receiver, and a support arm removably coupled to each bushing. Each support arm comprises a first end coupled to the bushing, a second end comprising a conduit receiver, a clamp receiver, and at least one connector portion provided on the first end of the support arm operatively configured to removably engage the support arm receiver. In one form, the bushing assembly is operably configured to support a conduit at a distance from the radially inner surface of the interoperating bushings to substantially prohibit contact between the conduit and the bushing assembly once the conduit is installed and fixed to the conduit receiver.

The aircraft bushing assembly previously described may further comprise a plurality of fastener receivers in each bushing operatively configured, such that the first bushing may be positioned in a different rotational orientation than the second bushing. In one form, the connector portion of the support arm is dovetail or t-shaped in cross section. The aircraft bushing assembly may also be operably configured to support a conduit at a radially inward distance from the radially inner surface of the interoperating bushings, and transversely outward from the plane defining the outer surface of the bushing, to substantially prohibit contact between the conduit and the bushing assembly once the conduit is installed and fixed to the conduit receiver. In one form, the pair of interoperating bushings are each substantially identical to each other.

The aircraft bushing assembly may be formed such that the connector portion of the support arm is dovetail or t-shaped in cross section, although angled dovetail embodiments, v-shaped embodiments, or other shapes may alternatively be used.

The aircraft bushing assembly can be arranged with at least one offset ring operably configured to be positioned between an inner surface of the recessing portion of one of the bushings and the panel. In one form, the offset ring comprises a tapered portion operably configured to interoperate with a flared portion of the surface defining a void in the panel.

The aircraft bushing assembly may utilize at least one connector portion provided on the first end of the support arm comprises a first connector portion, operably configured to align the conduit substantially parallel to and substantially concentric with an central axis of the bushing perpendicular to an outer surface of the bushing and a second connector portion, operably configured to align the conduit substantially perpendicular to the central axis of the bushing parallel to the outer surface of the bushing.

The aircraft bushing assembly may further comprise a plural saddle for attachment of a plurality of conduits, the plural saddle using at least two receiving surfaces operably configured to independently receive and hold a conduit, at least one clamp receiver operably configured to receive a conduit clamp and retain the conduit in contact with the clamp receiver wherein the plural saddle is operably configured to be removably coupled to the second end of the support arm.

The aircraft bushing assembly may also include a conduit offset clamp removably coupled to the second end of the support arm and operably configured to maintain the conduit at an offset distance from the conduit receiver.

DESCRIPTION OF THE PREFERRED EMBODIMENTS

Figure 1:
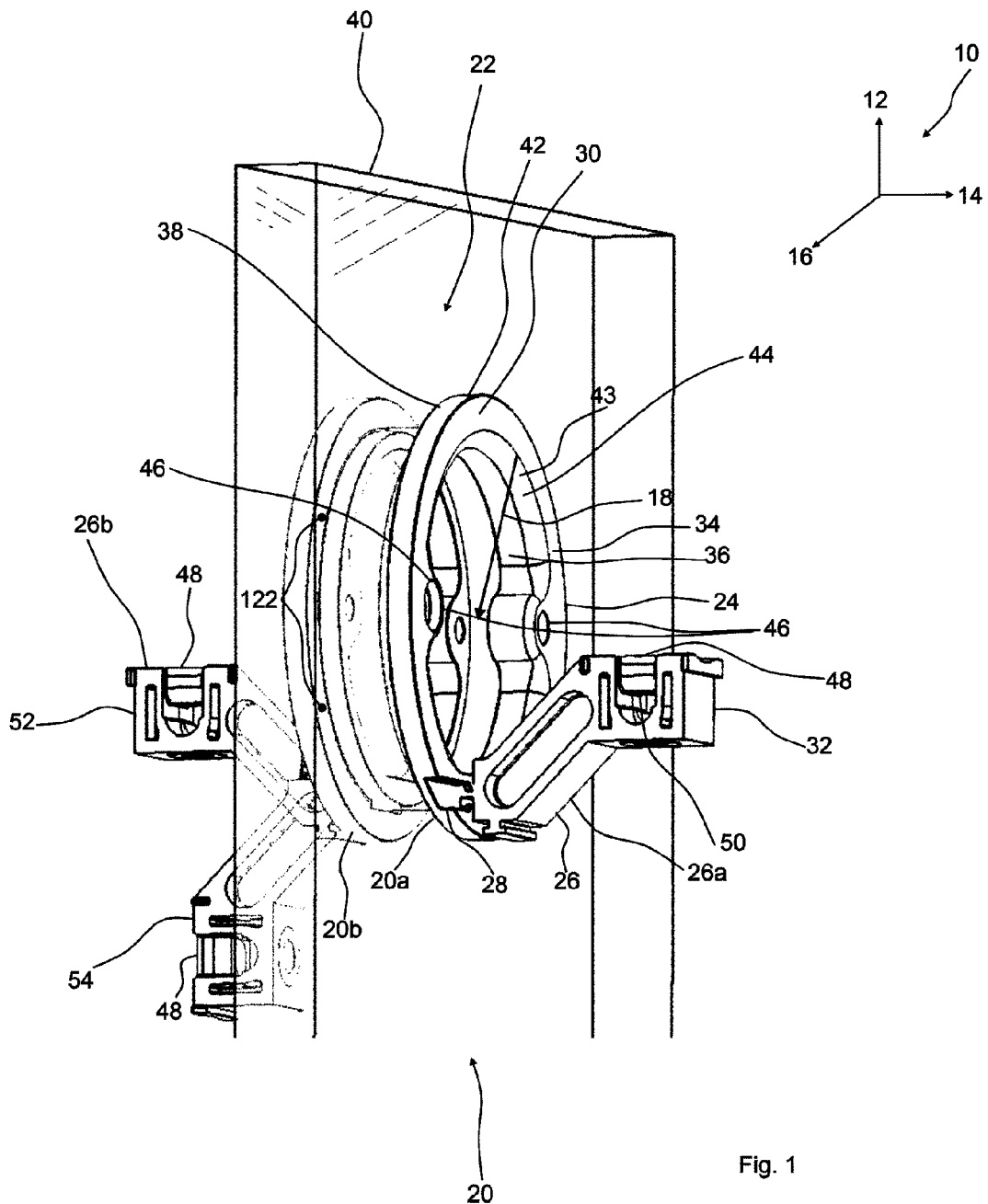
FIG. 1 is an isometric, environmental view of one embodiment of the disclosure, wherein the panel has been made transparent to show both sides of a bushing assembly.

In general, disclosed herein is a combined bushing assembly 22 utilizing a plurality of substantially identical bushing assemblies 20. Each of the bushing assemblies 20 comprises a bushing 24 coupled to a support arm 26. The support arms 26 have a first end 28 which is coupled to the outer surface 30 of the bushing 24 and furthermore have a second end 32 which is operatively configured to couple to a cable/bundle/tubing or similar apparatus.

Before continuing a detailed description, an axis system 10 is shown in FIG. 1 comprising a vertical axis 12, a transverse axis 14 and a longitudinal axis 16. To further enhance understanding of the embodiments, a radially inward direction 18 is shown, generally extending from the outer portion of the bushing 24 toward the center of the bushing 24. These axes are not intended to be limiting, but are simply incorporated to enhance understanding of the embodiments.

The term conduit will be used herein to disclose not only a plurality of substantially parallel wires held together in some manner, but it will be obvious one of ordinary skill in the art that a single wire, cable, wire bundle, tubing, conduit, or other structure could be equally utilized. The term conduit will be utilized for ease of understanding.

Looking to FIG. 1, the individual parts of this combined assembly will be shown. In general, each bushing 24 comprises a ring-like perimeter portion 34 and a recessing portion 36. In some forms, the perimeter portion 34 and recessing portion 36 will comprise a unitary structure. The perimeter portion 34 comprises a transverse inner surface 38 which will be in contact with the surface of the panel 40, and a perimeter surface 42, which in one form is substantially perpendicular to the panel 40. In one form, a chamfer 44 is provided between the perimeter surface 42 and recessing portion 36, which among other advantages would satisfy certain requirements that all sharp edges or flanged edges on the cable side of the bushing shall be strictly prohibited. In other words, the chamfer 44 would substantially prohibit chaffing of any conduit passing through the bushing 24. A plurality of fastener receivers 46 may be provided in the bushing 24 to couple a first bushing assembly 20a to a second bushing assembly 20b by way of screws, machine screws, bolts or similar fasteners. It may be desired in some applications to use electrically or thermally insulated fasteners, such as nylon screws. As shown, a plurality of radially opposed fastener receivers 46 is provided in each bushing assembly 20. In another form, a larger number of fastener receivers such as 3, 4, 5 or more may be provided to allow for the combined bushing assembly 22 to be positioned such that the first bushing assembly 20a has a different rotational orientation than the second bushing assembly 20b.

Figure 4:
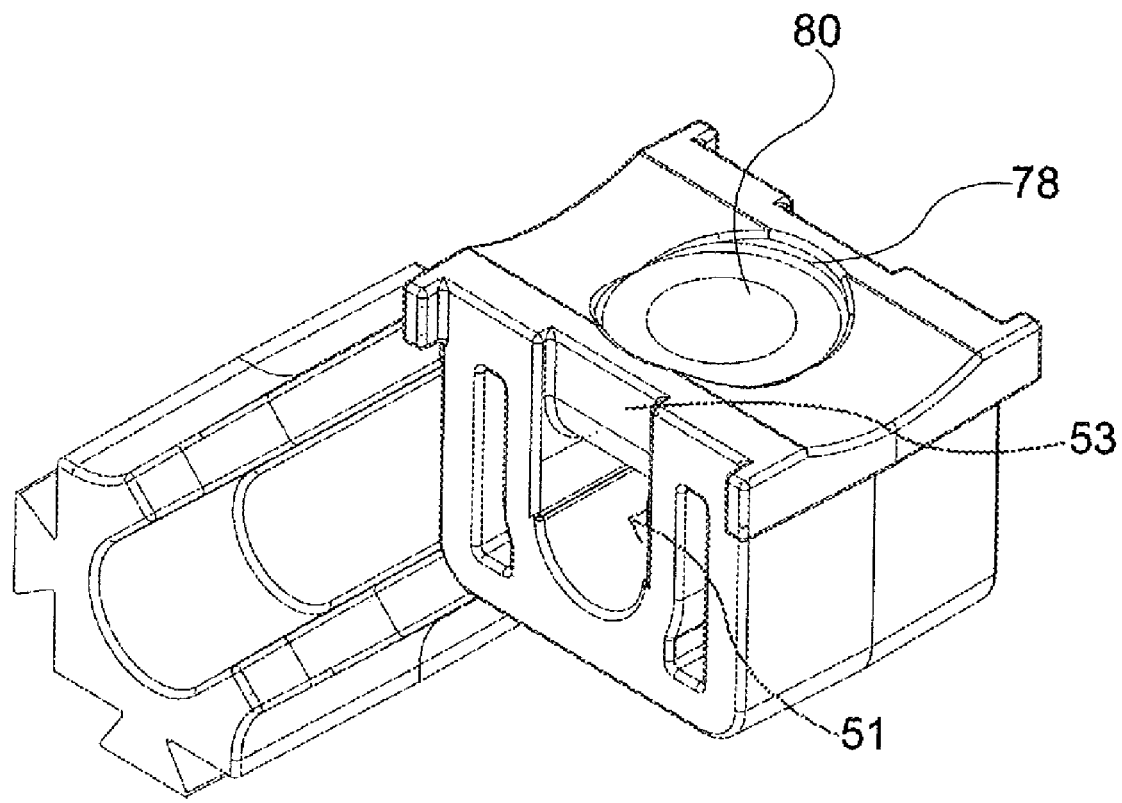
FIG. 4 is an isometric view of one embodiment of the disclosure showing a support arm.

Coupled to the bushing 24 is a support arm 26. In one form, the support arm 26 comprises a first end 28 coupled to the bushing 24 and a second end 32 comprising a conduit receiver 48 and a clamp receiver 50. The clamp receiver 50, in one form, comprises in turn a void 51 and a bridge or solid portion 53, as shown in FIG. 4. As shown in FIG. 1, a plurality of support arms 26 can be utilized, such as a front support arm 26a and a rear support arm 26b. Each of these support arms 26a and 26b would be independently coupled to the first bushing 20a and second bushing 20b, respectively. Furthermore, the support arms 26 can be positionably attached in a plurality of orientations. As shown, the rear support arm 26b can be mounted in a linear position 52 wherein the conduit receiver 48 would be substantially in line with the center of the bushing 24. Alternatively, the rear support arm 26b is shown in a non-linear position 54, wherein the conduit receiver 48 is substantially below and at a 90° angle to the axis of the bushing 24. By providing a removable support arm 26, the support arm 26 may be removed from the bushing 24 so that a relatively large conduit, or a relatively large connector on the conduit, may be passed through the combined bushing assembly 22, whereupon the support arm 26 is re-attached, and the conduit is secured to the conduit receiver 48. Each of the orientations shown will be described in more detail.

Figure 2:
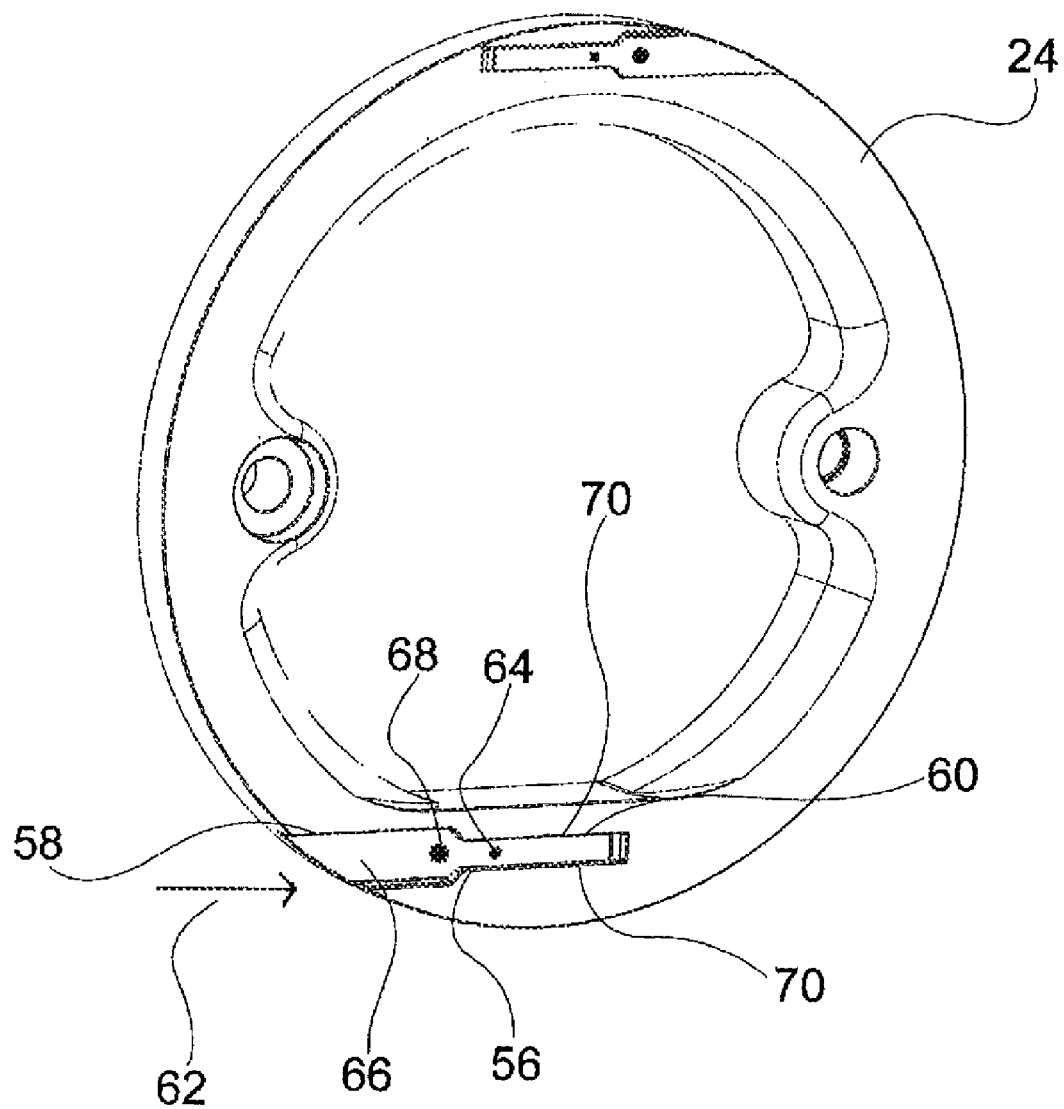
FIG. 2 is an isometric view of one embodiment of the disclosure showing a bushing.
Figure 3:
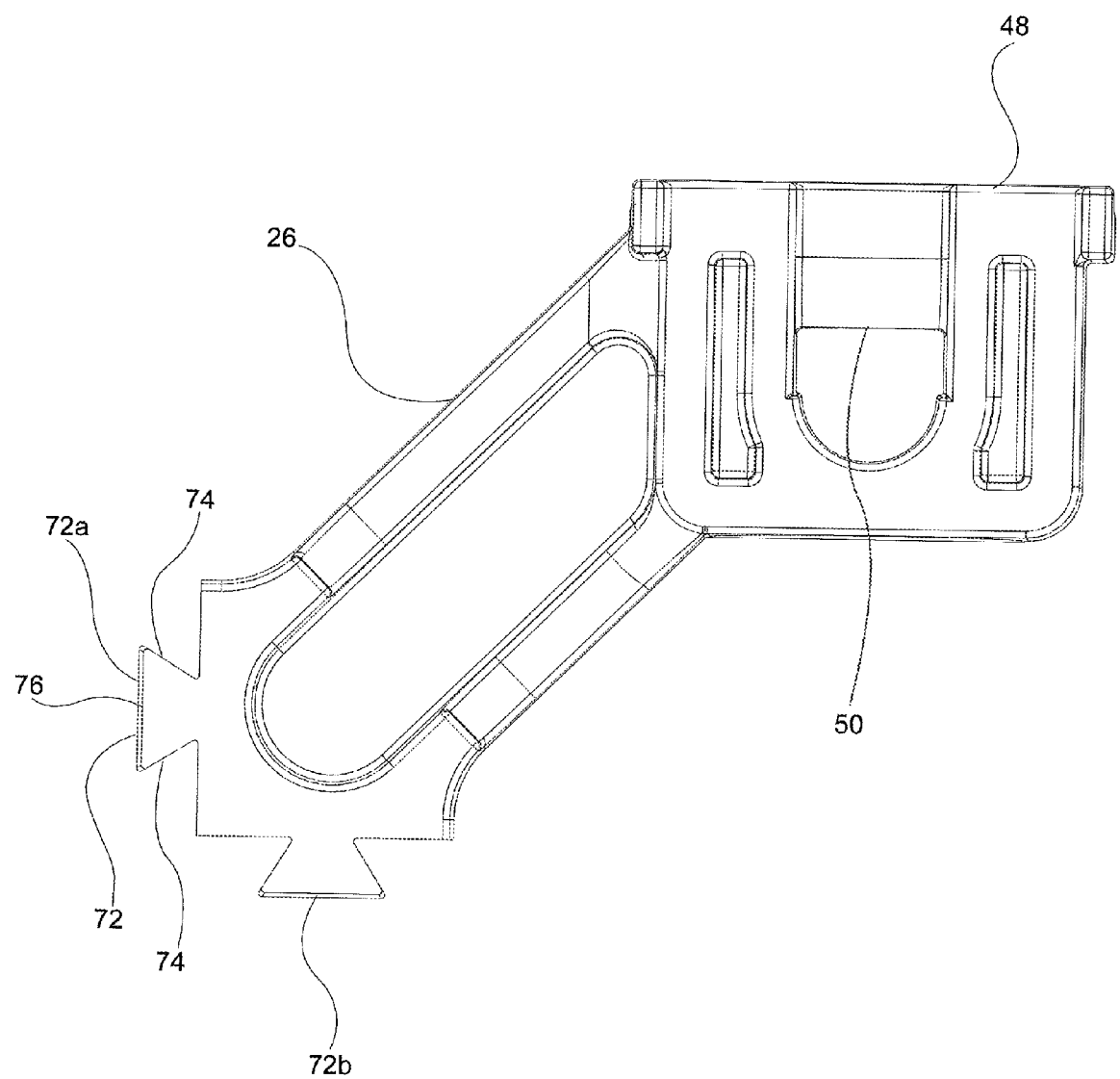
FIG. 3 is a side view of one embodiment of the disclosure showing a support arm.

Looking to FIG. 2, the bushing 24 is shown in more detail. Of particular note, the support arm receiver 56 is shown in one form, comprising a widened entry portion 58 and a narrow retaining portion 60. To engage the support arm 26 within the support arm receiver 56, in one form, a user places a connector portion 72 of the second end 28 of the support arm 26 within the wide portion 58 and then slideably engages the support arm 26 in the direction shown by arrow 62, wherein it is frictionally engaged and held by the narrow retaining portion 60. Furthermore, a raised detent 64 may be provided on the rear surface 66 of the support arm receiver 56. The detent 64 engages an indent in the first end 28 of the support arm 26, which is not shown. In one form, the detent 64 and matching indent can be reversed. Alternatively, a detent 68 adjacent the narrow portion 60 could be provided to the same end, optionally engaging the edge of the support arm receiver rather than an indent therein. The narrow portion 60 in one form comprises a plurality of flanges 70, which are operatively configured to engage a connector portion 72 of the support arm 26, as shown in FIG. 3. While the connector portion 72 and the flanges 70, as shown in FIGS. 1 and 2, comprise a T-shaped configuration, in an alternative embodiment, shown in FIG. 3, the connector portion 72 generally comprises a dovetail configuration consisting of a plurality of side surfaces 74 and a rear surface 76. To allow for multiple orientations of the support arm 26 relative to the bushing 24, a plurality of connector portions 72 may be provided. In one form, as shown in FIG. 3, a linear connector portion 72a and a non-linear connection portion 72b may be provided on the support arm, which allow for the support arm 26 to be mounted in a variety of orientations, which can in one embodiment be seen by comparing the linear position 52 with the nonlinear position 54, shown in FIG. 1.

Referring still to FIG. 2, a plurality of support arm receivers may be provided on each bushing 24, to allow for a multitude of arrangements of the support arms 26 for various installations.

Figure 8:
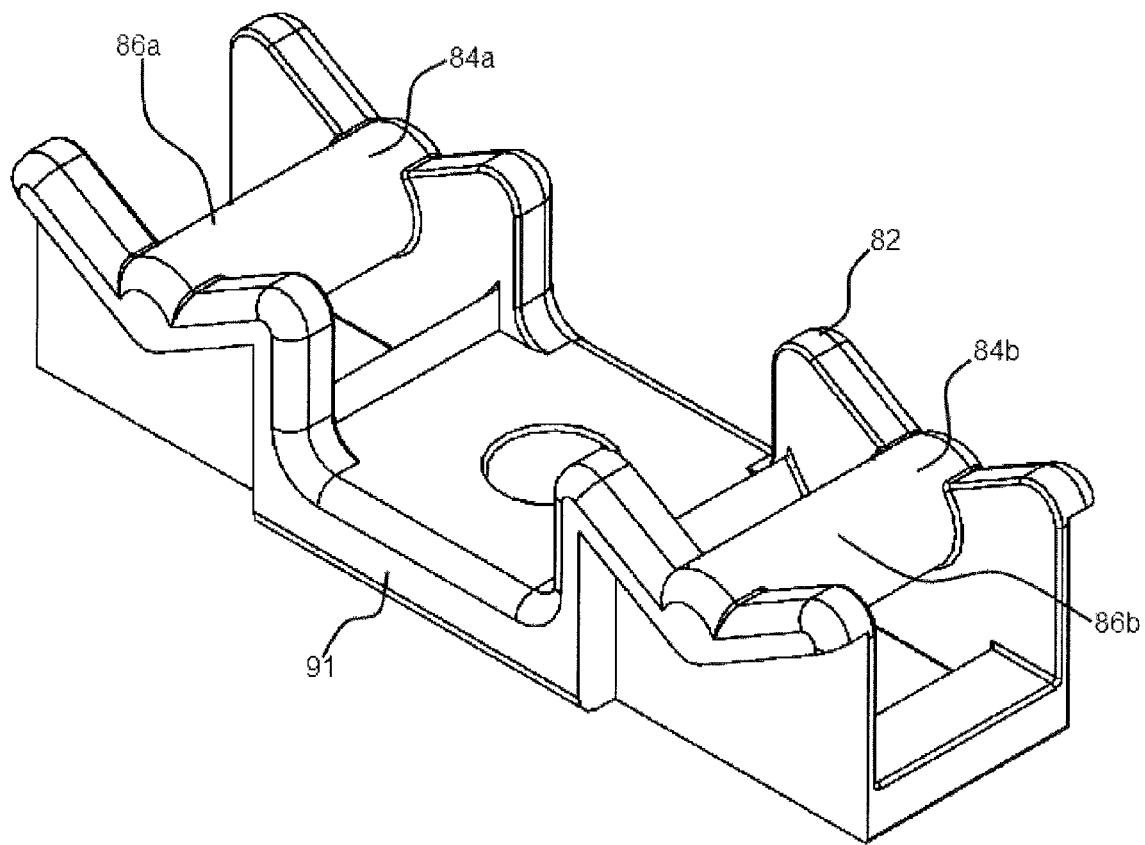
FIG. 8 is an isometric, environmental view of one embodiment of the disclosure showing a plural saddle coupled to a support arm.

Continuing with FIG. 3, the conduit receiver portion 48 and clamp receiver portion 50 can be very clearly seen. In FIG. 4, a recess 78 and pass-through void 80 are shown, which in one form allow for a plural saddle 82 to be utilized, shown in FIG. 8. The plural saddle 82 comprises at least two receiving surfaces 84, such as a first receiving surface 84a and a second receiving surface 84b. This arrangement allows the plural saddle 82 to couple two or more conduits upon the support arm and will substantially hold the conduits in a parallel arrangement. In this embodiment, a clamp receiver 86 may be provided with each receiving surface, such as clamp receivers 86a and 86b, which allows for the plural saddle 82 to firmly and rigidly couple the conduit to the receiving surface 84 by using zip ties, wire ties, tape, or equivalents. Furthermore, a fastener, such as a machine screw or similar structure, can be utilized to hold the plural saddle 82 against the support arm when used in conjunction with a fastener such as a nut. Alternatively, the fastener may pass through the void 80 and be engaged directly by the lower portion 91 of the plural saddle 82. In one form, the plural saddle 82 may be partially reversed, such that the main body attaches to the upper surface of the support arm 26, with the receiving surfaces 84 maintained in the orientation shown.

Figure 5:
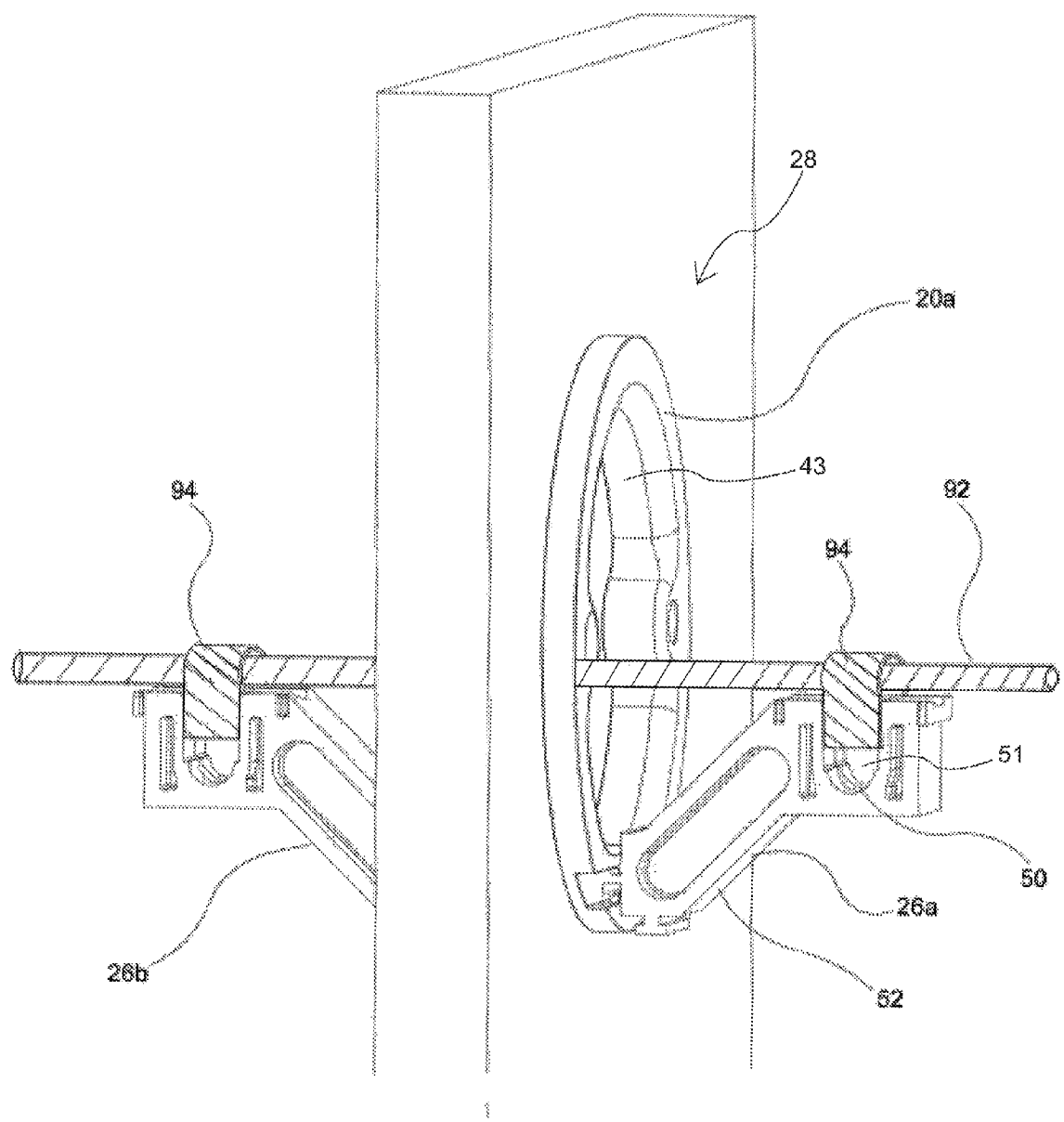
FIG. 5 is an isometric, environmental view of one embodiment of the disclosure showing a wire bundle in a linear configuration.

Looking to FIG. 5, a linear configuration is shown wherein the front support arm 26a and the rear support arm 26b generally hold a conduit upon the support arm 26. In this linear configuration, both of the support arms 26a and 26b are in the linear position previously disclosed. In this configuration, the conduit 92 passes substantially through the center of each of the bushing 20 and satisfies requirements as to the offset between the inward surface 43 of the bushing 20 and the exterior surface of the conduit 92. To hold the conduit 92 against the conduit receiver 48 of each support arm 26, a clamp 94, such as a zip tie or similar structure, may be utilized which passes through, or is engaged by the clamp receiver 50.

Figure 6:
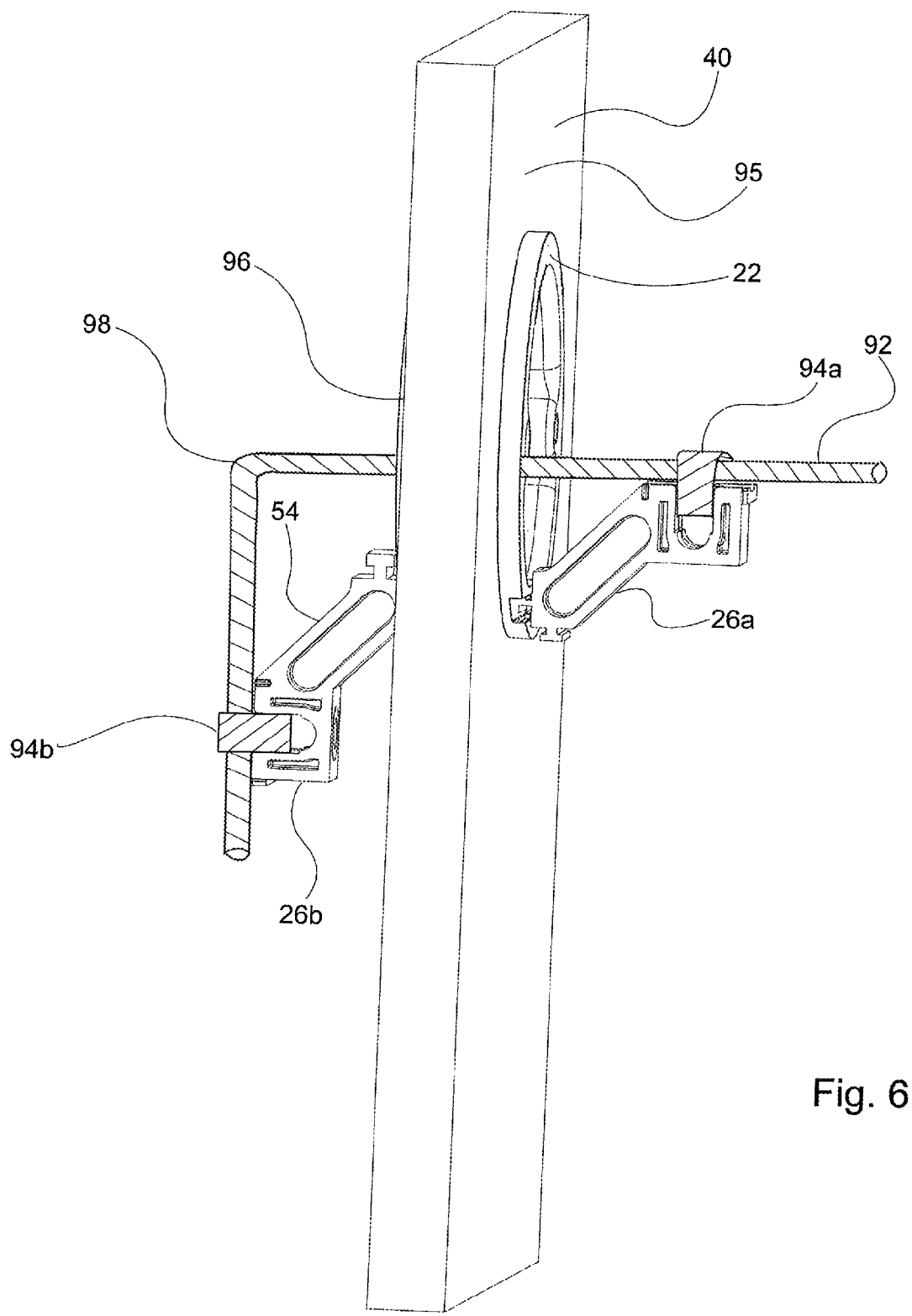
FIG. 6 is an isometric, environmental view of one embodiment of the disclosure showing a wire bundle and a curved configuration.
Figure 7:
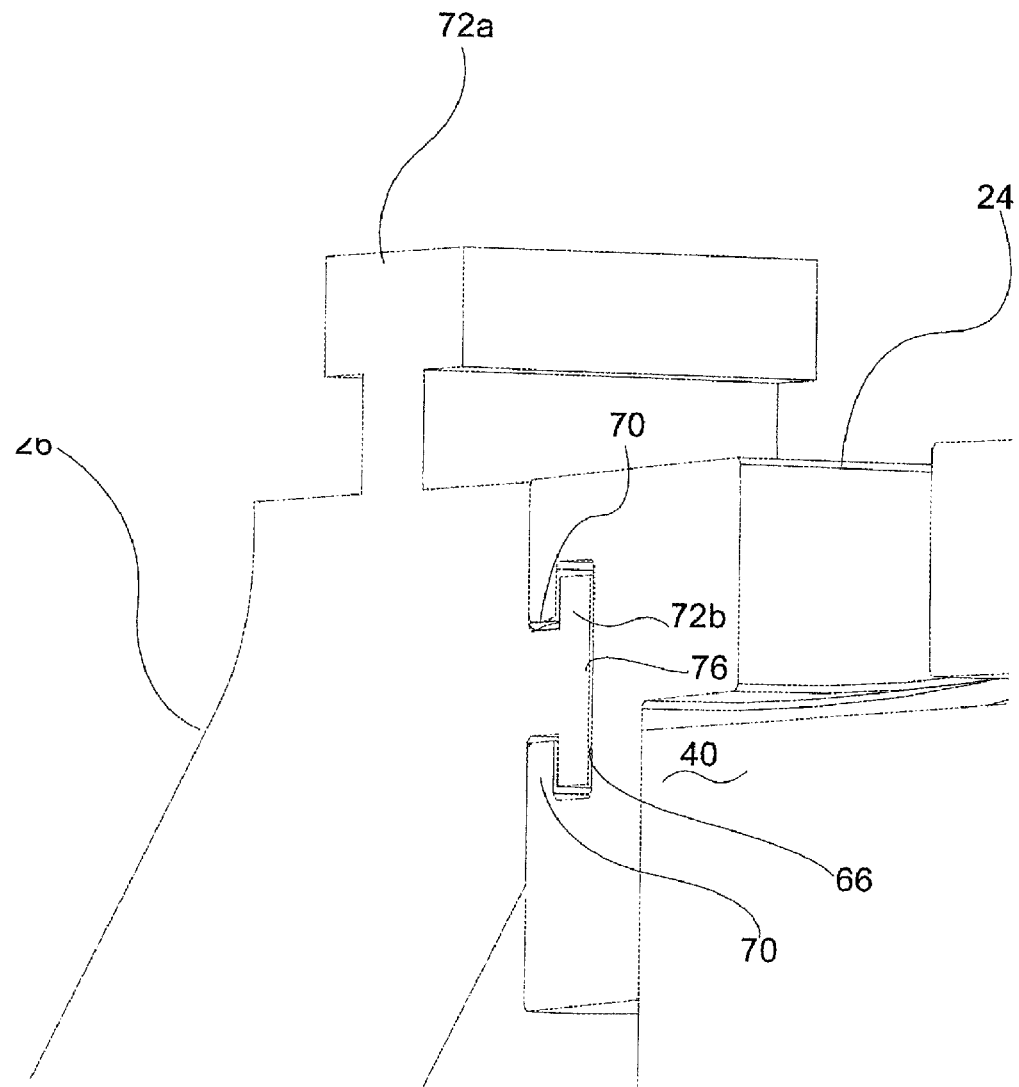
FIG. 7 is a detail, isometric, cutaway view of one embodiment of a support arm coupled to a bushing.

Looking to FIG. 6, a curved configuration is shown wherein the conduit 92 is held in place against the front support arm 26a as previously described relative to FIG. 5, such that the conduit 92 is substantially perpendicular to the front surface 95 of the panel 40 as it enters the combined bushing assembly 22. As the conduit 92 exits the rear surface 96 of the panel 40, it is still substantially perpendicular to the rear surface 96. When the rear support arm 26b is in the nonlinear position 54, the conduit 92 will comprise a bend 98 before being coupled to the rear support arm 26b by a rear clamp 94b. Of course, it is conceivable that both the front support arm 26a and rear support arm 26b may be in various configurations to allow for a range of approach angles between the conduit 92 and a panel 40. Alternatively, the entire combined bushing assembly 22 may be rotated within the void provided in the panel 40 to accomplish an even wider range of approach angles. Additionally, the front bushing assembly 20a can be reoriented with respect to the rear bushing assembly 20b, as previously discussed, to enable an even wider range of approach angles.

Figure 9A:
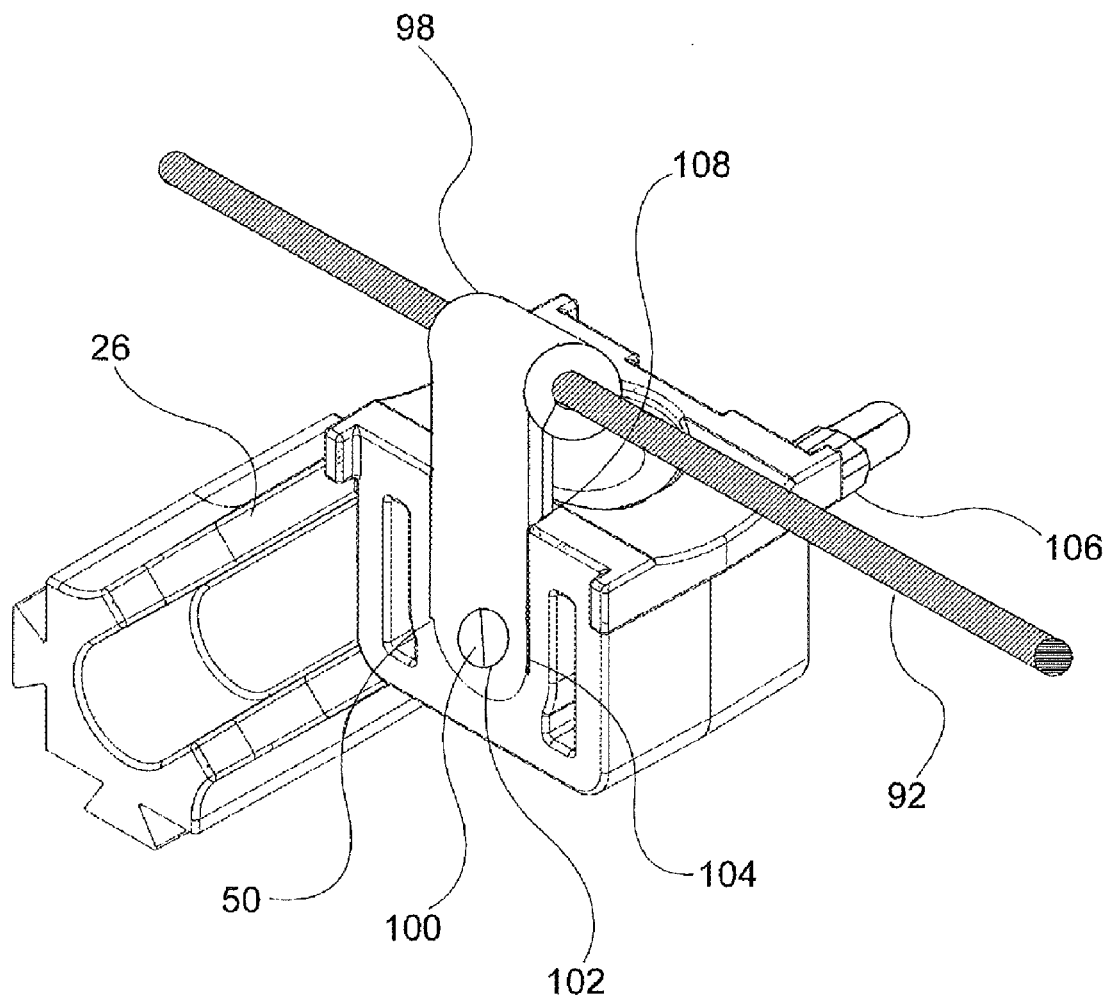
FIG. 9A is an isometric view of one embodiment of the disclosure showing a wire clamp coupled to a support arm.

Looking to FIG. 9A, a support arm 26 is shown with a conduit 92 attached thereto by way of a conduit offset clamp 98. Many such conduit offset clamps can be utilized, such as the clamping band disclosed in U.S. Pat. No. 4,490,888, incorporated herein by reference. In the example shown in FIG. 9A, a fastener 100 fits through a hole 102 in the lowermost portion 104 of the conduit offset clamp 98. The fastener 100 passes through the clamp receiver 50 and may be held in place by a nut 106, or alternatively may be threaded into the clamp receiver 50. A recess 108 in the support arm 26 holds the conduit offset clamp 98 in an upright and rigid position and substantially prohibits rotation of the conduit offset clamp 98 relative to the support arm 26. As shown, the conduit offset clamp 98 "folds over" the conduit 92 in such a way that both ends of the conduit offset clamp 98 are held in place by the fastener 100 against the clamp receiver 50. Alternatively, the conduit offset clamp could be a unitary structure with a rigid hole therethrough or a partial receiver wherein a zip tie or other device holds the conduit 92 against the conduit clamp 98.

Figure 9B:
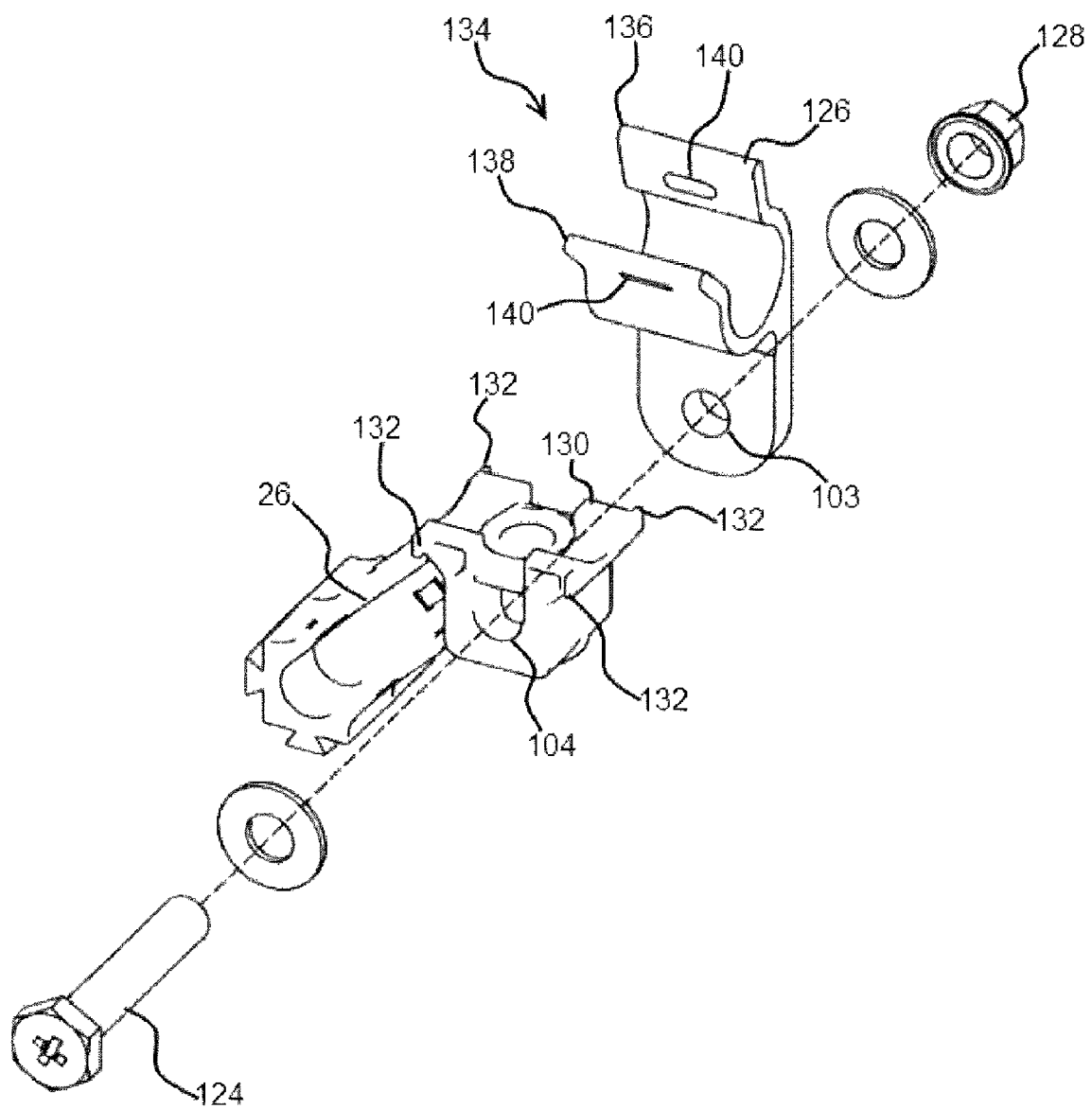
FIG. 9B is an isometric view of another embodiment of the disclosure showing a wire clamp coupled to a support arm.

FIG. 9B shows a different embodiment of a support arm 26 is shown with a conduit offset clamp 126. In the example shown in FIG. 9B, a fastener 124 fits through a hole 103 in the lowermost portion 104 of the conduit offset clamp 126. The fastener 124 passes through the clamp receiver 50 and may be held in place by a nut 128, or alternatively may be threaded into the clamp receiver 50. A recess 130 in the support arm 26 holds the conduit offset clamp 98 in an upright and rigid position and substantially prohibits rotation of the conduit offset clamp 126 relative to the support arm 26. The recess 130 as shown may be defined by a plurality of tabs 132 on either side of the support arm 26. the tabs 132 function to prohibit rotation of the offset clamp 126 relative to the support arm 26. As shown, the conduit offset clamp 126 has an opening 134 into which the conduit is placed and held in place by a plurality of extensions 136 and. Alternatively, the conduit offset clamp 126 may comprise a plurality of surfaces defining an plurality of openings 140 on either extension 136/138 wherein a zip tie or other device holds the conduit 92 within the conduit offset clamp 126.

Figure 10:
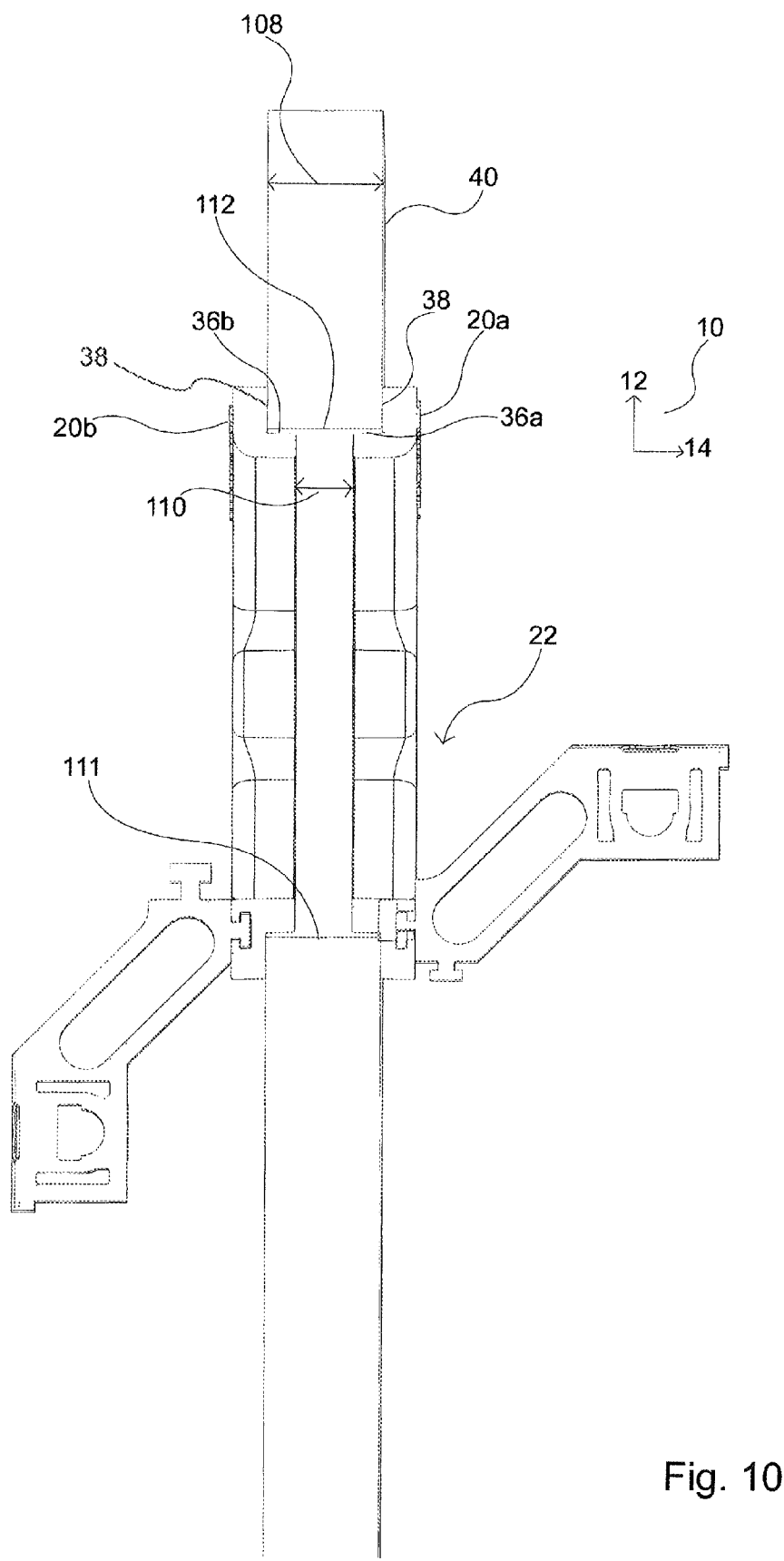
FIG. 10 is a side cutaway view of one embodiment of the disclosure mounted to a panel.

The cross-sectional view of FIG. 10 shows a cross-sectional view of a combined bushing assembly 22 coupled to a panel 40. As previously described, the combined bushing assembly 22 comprises a first bushing assembly 20a and a second bushing assembly 20b. In this example, the panel 40 has a thickness 108 which is substantially larger than the combined recessing portions 36a and 36b. Thus, there is a gap 110 between the transverse inner surfaces of the bushing assemblies 20a and 20b when the two bushing assemblies are installed. This gap 110 allows for a frictional engagement between the inner surface 38 of the bushing assembly 20a and the surface of the panel 40. In some applications, the inner surface 111 of the receiving void 112 may be sealed by way of a rigid structure, sealing compound, or other means. This can be especially effective when the panel 40 is made of a corrugated or honeycomb-like structure, often found in aircraft interiors.

Figure 11:
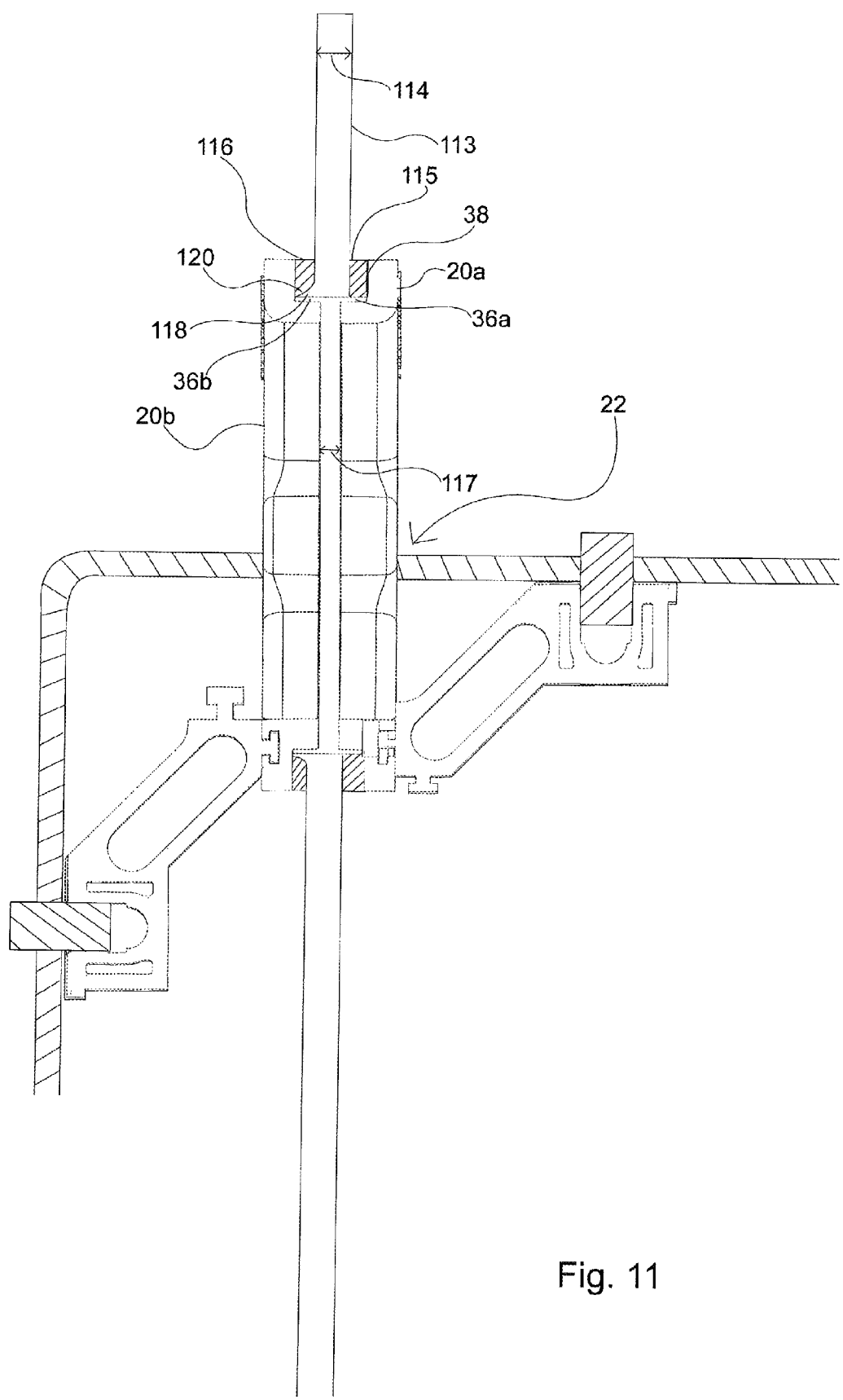
FIG. 11 is a side cutaway view of one embodiment of the disclosure mounted to a substantially thin panel.

Looking to FIG. 11, a combined bushing assembly 22 is depicted mounted upon a panel 113, comprising a thickness 114 substantially thinner than the panel 40 of FIG. 10. Such thin panels are often found in the rigid structural members of aircraft between the outer skin and the interior panels. These rigid structures often have lightening holes provided therein to substantially reduce the overall weight of the structure or aircraft without compromising structural integrity. Prior art means for providing wiring or other conduits through these structures did not allow the use of the lightening holes, as it has not been possible to fulfill the requirements set forth by the aircraft manufacturers or other entities. Thus, it has been found that a means for providing a grommet or bushing and support arm has great utility in increasing the effectiveness with which conduit can be provided through these lightening holes. While it would be possible to reduce the recessing portions 36a and 36b, it may also be desired to provide a plurality of offset rings 115 and 116 to offset the inner surface 38 of the bushing assembly 20a from the panel 112 on one or both sides of the panel 112. Thus there may maintain a slight gap 117 between the two bushing assemblies 20a and 20b. In some instances, the void provided in the panel 112 may have a flared portion 118 immediately adjacent the opening formed as the void was punched, drilled, or cast in the panel 40. To allow for a proper fit between the interoperating parts, one of the offset rings 116 may comprise a tapered portion 120.

In one form, the combined bushing assembly 22 may be formed by way of injection molding, or it is also possible to machine these parts from solid stock or other production methods. The individual parts may be comprised of plastics, polymers or metals. Parts made from nylon 66, or specifically glass-filled nylon, have been found to work especially well. In one form, a product comprising 30% glass is utilized to allow for substantial rigidity and ease of manufacture. This composition also provides an electrically and thermally insulating barrier between the wire bundle and the panel. Additionally, this composition fulfills the flammability and toxicity standards of aircraft manufacturers.

Figure 12:
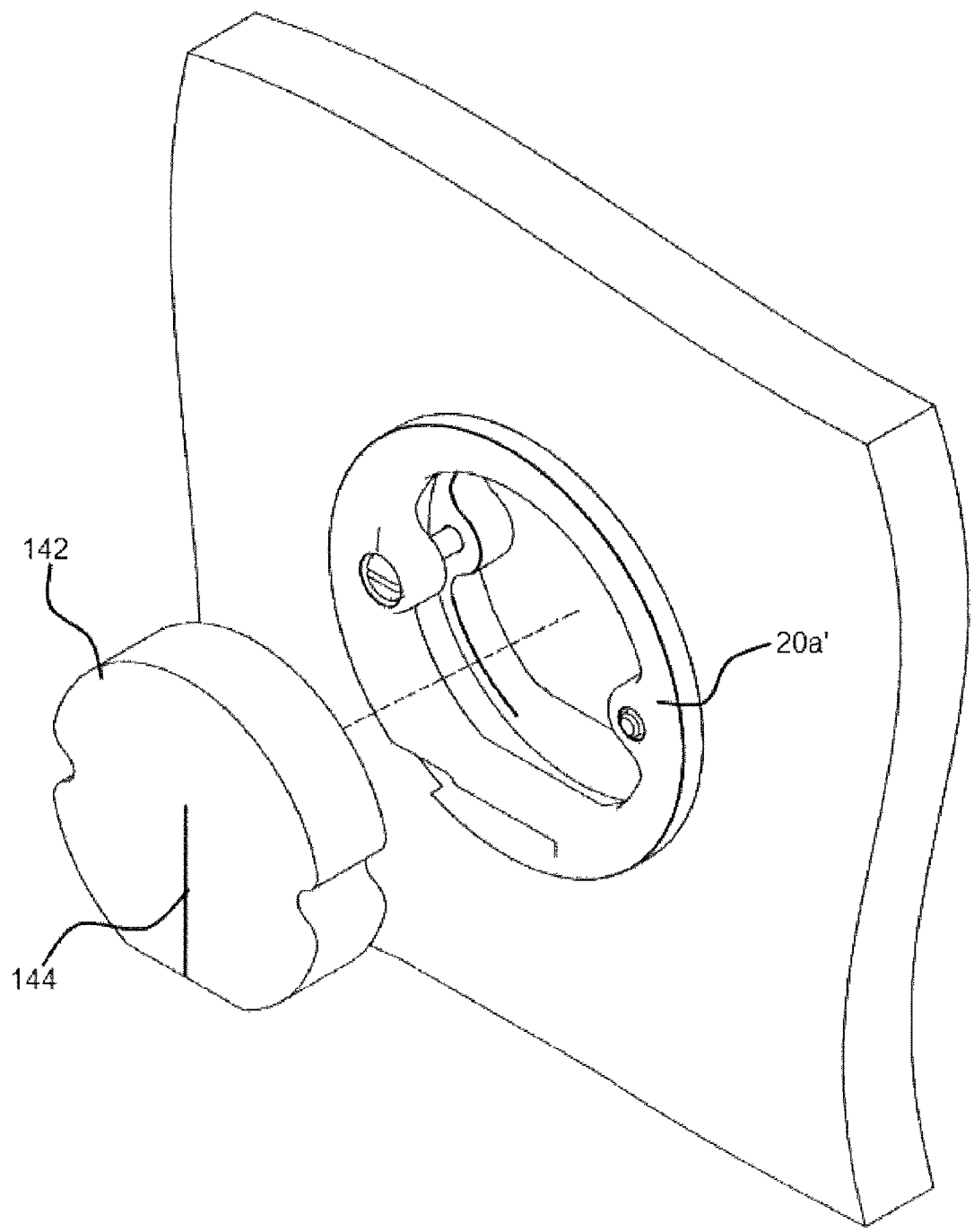
FIG. 12 shows an insert in one form which may be used as a barrier within the bushing.

Looking to FIG. 5, it can be seen that a substantial distance offsets the wire bundle 92 within the interior surface 43 of the bushing assembly 28. In some applications, it may be desired to fill this open region to prohibit vapors or debris from passing therethrough. Thus, an insert 142 as shown for example in FIG. 12 may be utilized comprising rigid or semi-rigid materials, such as for example open cell foam, which is frictionally engaged around the wire bundle and within the interior space provided by the bushing assembly 20a. In one form, a slit 144 is provided to fit around the wire bundle or conduit.

In one form, a plurality of detents 122, as shown in FIG. 1, are provided on the transverse inner surface of each bushing to substantially prohibit rotation of the combined bushing assembly 22 relative to the panel 40 once the combined bushing assembly 22 is installed and the fasteners passed through the fastener receivers 46 are tensioned.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

Therefore I claim:

1. An aircraft interior bushing assembly comprising:
   a. a pair of interoperating bushings each bushing comprising
      i. a recessing portion,
      ii. a radially inner surface operably configured to contact a surface defining a void in a panel,
      iii. a perimeter portion wherein the radial dimension of the perimeter portion is substantially larger than the recessing portion,
      iv. a support arm receiver;
   b. a support arm removably coupled to each of said bushing, each support arm comprising
      i. a first end coupled to the bushing,
      ii. a second end comprising a conduit receiver,
      iii. a clamp receiver,
      iv. at least one connector portion provided on the first end of the support arm operatively configured to removably engage the support arm receiver; and
   c. wherein the bushing assembly is operably configured to support a conduit at a distance from the radially inner surface of the interoperating bushings to substantially prohibit contact between the conduit and the bushing once the conduit is installed and fixed to the conduit receiver.

2. The aircraft bushing assembly as recited in claim 1 further comprising a plurality of fastener receivers in each of said bushing operatively configured such that the first bushing may be positioned different rotational orientation than the second bushing.

3. The aircraft bushing assembly as recited in claim 1 wherein the connector portion of the support arm is dovetail shaped in cross section.

4. The aircraft bushing assembly as recited in claim 1 wherein the bushing assembly is operably configured to support a conduit at a radially inward distance from the radially inner surface of the interoperating bushings, and transversely outward from the plane defining the outer surface of the bushing, to substantially prohibit contact between the conduit and the bushing assembly once the conduit is installed and fixed to the conduit receiver.

5. The aircraft bushing assembly as recited in claim 1 wherein the pair of interoperating bushings are each substantially identical to each other.

6. The aircraft bushing assembly as recited in claim 1 wherein the connector portion of the support arm is v-shaped in cross section.

7. The aircraft bushing assembly as recited in claim 1 further comprising at least one offset ring operably configured to be positioned between an inner surface of the recessing portion of one of the bushings and the panel.

8. The aircraft bushing assembly as recited in claim 7 wherein the offset ring comprises a tapered portion operably configured to interoperate with a flared portion of the surface defining a void in the panel.

9. The aircraft bushing assembly as recited in claim 1 wherein the at least one connector portion provided on the first end of the support arm comprises:
   a. a first connector portion, operably configured to align the conduit substantially parallel to and substantially concentric with an central axis of the bushing perpendicular to an outer surface of the bushing; and
   b. a second connector portion, operably configured to align the conduit substantially perpendicular to the central axis of the bushing parallel to the outer surface of the bushing.

10. The aircraft bushing assembly as recited in claim 1 further comprising a plural saddle comprising:
    a. at least two receiving surfaces operably configured to independently receive and hold a conduit;
    b. at least one clamp receiver operably configured to receive a conduit clamp and retain the conduit in contact with the clamp receiver; and
    c. wherein the plural saddle is operably configured to be removably coupled to the second end of the support arm.

11. The aircraft bushing assembly as recited in claim 1 further comprising a conduit offset clamp removably coupled to the second end of the support arm and operably configured to maintain the conduit at an offset distance from the conduit receiver.

* * * * *